United States Patent [19]
Naber et al.

[11] Patent Number: 5,916,294
[45] Date of Patent: Jun. 29, 1999

[54] SYSTEM AND METHOD FOR ESTIMATING TAILPIPE A EMISSIONS IN A VEHICLE

[75] Inventors: Jeffrey D. Naber, Dearborn; Neil J. Adams, Novi; Donald J. Remboski, Jr., Dearborn, all of Mich.; Daniel A. Young, Gurnee, Ill.

[73] Assignee: Motorola Inc., Schaumburg, Ill.

[21] Appl. No.: 08/903,892

[22] Filed: Jul. 31, 1997

[51] Int. Cl.$^6$ .................................................. G01M 15/00
[52] U.S. Cl. ........................ 701/109; 60/276; 73/23.31; 73/118.1
[58] Field of Search .............................. 73/23.31, 23.32, 73/118.1, 116; 60/277; 123/688; 701/103, 109

[56] References Cited

U.S. PATENT DOCUMENTS

| | | | |
|---|---|---|---|
| 4,471,738 | 9/1984 | Smojver | 73/23.32 |
| 5,157,921 | 10/1992 | Ito et al. | 73/118.1 |
| 5,182,907 | 2/1993 | Kuroda et al. | 60/277 |
| 5,216,882 | 6/1993 | Kuroda et al. | 73/118.1 |
| 5,265,417 | 11/1998 | Visser et al. | 60/277 |
| 5,267,472 | 12/1993 | Schneider et al. | 60/277 |
| 5,335,538 | 8/1994 | Blischke et al. | 73/118.1 |
| 5,388,454 | 2/1995 | Kuroda et al. | 73/118.1 |
| 5,602,737 | 2/1997 | Sindano et al. | 73/118.1 |
| 5,627,757 | 5/1997 | Comignaghi et al. | 73/118.1 |
| 5,684,248 | 11/1997 | Iwata | 73/118.1 |
| 5,715,678 | 2/1998 | Aronica et al. | 73/118.1 |
| 5,737,917 | 4/1998 | Nagai | 60/277 |

OTHER PUBLICATIONS

"Internal Combustion Engine Fundamentals" by John B. Meywood, copyright 1998, pp. 146–147, 570–571.

*Primary Examiner*—George Dombroske
*Attorney, Agent, or Firm*—Nicholas C. Hopman

[57] ABSTRACT

A system and method estimates tailpipe emissions by sensing (703) a catalyzed gas stream (506) and providing a total-combustible gas signal (511) dependent thereon. The total-combustible gas signal (511) has a magnitude comprised of a first portion, dependent on a concentration of the hydrocarbon gas in the catalyzed gas stream (506), and a second portion, dependent on a concentration of the other combustible gasses in the catalyzed gas stream (506). A magnitude relationship between the first portion and the second portion is variable when the catalyzed gas stream (506) transitions into a region on the rich side of stoichiometry. The variability the magnitude relationship of the first and second portions is filtered out so that the magnitude relationship is substantially constant when the catalyzed gas stream (506) transitions into the region on the rich side of stoichiometry. The filtered signal is then integrated and compared to a threshold and an out-of-compliance signal (523) is provided when the filtered integrated signal (519) exceeds the threshold.

30 Claims, 4 Drawing Sheets

SYSTEM AND METHOD FOR ESTIMATING TAILPIPE A EMISSIONS IN A VEHICLE

FIELD OF THE INVENTION

This invention is related to the field of measuring engine emissions, and is particularly useful in vehicular applications.

BACKGROUND OF THE INVENTION

Current law in California, and laws being passed in other regions of the United States and around the world, require that emission reduction equipment incorporated on vehicles be continuously monitored by on-board-diagnostic (OBD) systems. The function of these OBD systems is to report and set fault codes when emission control devices no longer meet the mandated emission levels.

One of the systems to be monitored is the catalytic-converter, which in current automotive applications is used to simultaneously oxidize carbon monoxide (CO) and unburned hydrocarbons (HC) while reducing oxides of nitrogen ($NO_x$) in the exhaust gas stream of a spark-ignited engine. Sensors applied in these monitoring applications continuously measure gasses associated with the catalytic-converter and ascertain when the conversion efficiency of the system has been reduced to a level where it is no longer in compliance with the mandated levels of exhaust gas pollutants.

Compliance to the currently defined OBD catalyst monitoring requirement can be accomplished by either one of two metrics. In the case of the first metric, the catalyst system shall be considered malfunctioning when its conversion capability decreases to the point that the HC emissions exceed the applicable emission threshold specified as follows. Transitional Low Emission Vehicles (TLEVs) applications shall employ an emission threshold malfunction criterion of 2.0 times the applicable Federal Test Procedure (FTP) hydrocarbon standard plus the emissions from a test run with a representative 4,000 mile catalyst system (125 hours of operation for medium-duty vehicles with engines certified on an engine dynamometer). The emission threshold criterion for Low Emission Vehicles (LEVs) and Ultra Low Emission Vehicles (ULEVs) applications shall be 2.5 and 3.0 times the applicable FTP hydrocarbon standard, respectively, plus the emission level with a representative 4,000 mile catalyst system. Notwithstanding, beginning with the 1998 model year, manufacturers shall phase in an emission threshold of 1.75 times the applicable FTP hydrocarbon standard for all categories of low emission vehicles, which shall not include the emission level with a 4,000 mile catalyst system. The phase-in percentages (based on the manufacturer's projected sales volume for low emission vehicle applications) shall equal or exceed 20 percent in the 1998 model year, 40 percent in the 1999 model year, 60 percent in the 2000 model year, 80 percent in the 2001 model year, with 100 percent implementation for the 2002 model year. The malfunction threshold shall be based on the emission standards to which the vehicle is certified. For LEV applications, hydrocarbon emissions shall be multiplied by the certification reactivity adjustment factor for the vehicle.

Regarding the second metric, the efficiency determination shall be based on an FTP test wherein a malfunction is noted when the cumulative Non-Methane Hydrocarbon emissions measured at the outlet of the monitored catalyst(s) are more than 50 percent of the cumulative engine-out emissions measured at the inlet of the catalyst(s). The catalyst system shall be considered malfunctioning when its conversion capability decreases to the point that the average FTP non-methane hydrocarbon conversion efficiency of the monitored portion of the catalyst system falls below 50 percent.

A prior art scheme uses electrochemical exhaust gas sensors, primarily Heated Exhaust Gas Oxygen (HEGO) sensors, and their switching characteristics to deduce catalyst deterioration. Currently, zirconia based electrochemical exhaust gas sensors are used for both closed loop engine control and catalyst efficiency monitoring. As typically used, the HEGO provides an indication only of whether the equilibrated exhaust is rich or lean of stoichiometric. The primary deficiency of this prior art scheme comes in its application to the OBD systems to detect catalyst efficiency. This approach relies on measuring a ratio of a number of voltage level transitions (switches) of two HEGOs, one placed in front of the catalytic converter and one placed behind the catalytic converter. Contemporary catalytic converters have a significant oxygen storage capacity (OSC) that dampens out the normal air/fuel cycling used in engine controller strategies. Therefore, the HEGO placed in front of the catalyst records a switch every time the exhaust gas moves from either a lean-to-rich or rich-to-lean state. The aft-mounted HEGO sensor however does not record a switch every time the front HEGO sensor switches, because the OSC of the catalyst acts as an integrator, smoothing out the air/fuel oscillations. As the catalyst deteriorates because of aging, the OSC of the catalyst decreases and therefore the aft HEGO sensor records more switches. By monitoring the aft-mounted HEGO and fore-mounted HEGO sensor switching transitions for a long period and ratioing the number of switching transitions, a parameter referred to as the switch ratio is obtained. This switch ratio is a indicator of the OSC of the catalyst. This switch ratio is then used as a diagnostic parameter for determining the hydrocarbon conversion efficiency of the catalyst. The most difficult problem with this technique is that the switch ratio, which is a measure of the OSC, and the hydrocarbon conversion efficiency of the catalyst, do not normally correlate except under severe aging of the catalyst. As a result, this technique has poor resolution with only the ability to determine gross changes in the catalyst's conversion efficiency, and can be prone to misdiagnosis.

Another problem with the switch ratio technique is that it relies on the air/fuel modulations that result from the error in the air/fuel controller. These modulations can change or even be eliminated with advanced controller strategies, leaving no method of catalyst diagnostic with the standard HEGO sensors.

Other catalyst monitors relying on calorimetric or hydrocarbon sensors have been proposed, but these sensors only operate under lean conditions when there is sufficient oxygen to reduce the existing reducing species.

What is needed is an improved system for estimating tailpipe emissions in a vehicle that complies with the OBD requirements over the full FTP cycle including rich air-fuel excursions. The new approach should also have improved accuracy and resolution, and be less complex.

DETAILED DESCRIPTION OF A PREFERRED EMBODIMENT

A system and method estimates tailpipe emissions by sensing a catalyzed gas stream and providing a total-combustible gas signal dependent thereon. The total-combustible gas signal has a magnitude comprised of a first portion, dependent on a concentration of the hydrocarbon gas in the catalyzed gas stream, and a second portion, dependent on a concentration of the other combustible gasses in the catalyzed gas stream. A magnitude relationship between the first portion and the second portion is variable when the catalyzed gas stream transitions into a region on the rich side of stoichiometry. The variability the magnitude relationship of the first and second portions is filtered out so that the magnitude relationship is substantially constant when the catalyzed gas stream transitions into the region on the rich side of stoichiometry. The filtered signal is then integrated and compared to a threshold and an out-of-compliance signal is provided when the filtered integrated signal exceeds the threshold. The threshold is determined by emissions regulations and can be predetermined based on engine-catalytic converter testing, and also be made adaptive to powertrain operating conditions. Before the details of the inventive structure are revealed, some background on performance of total-combustible sensors (used in the preferred embodiment) will be detailed.

A total-combustible sensor is a sensor that provides a signal indicative of a concentration of a multitude of gasses combusted within the total-combustible sensor. In an automotive application, a gas-selective sensor can be designed to measure substantially all gasses in a post-catalytic converter gas stream. From an emissions viewpoint, magnitudes of unburned carbon monoxide (CO) gas and hydrocarbon (HC) gas in the post-catalytic converter gas stream need to be detected. Some performance aspects of a total-combustible gas sensor will be introduced next.

Figure 1:
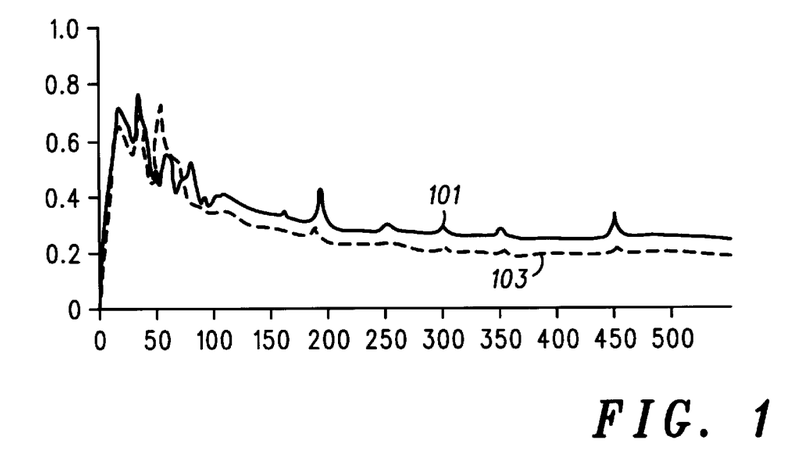
FIG. 1 is a graph illustrating a total-combustible gas signal from a total-combustible sensor, and a hydrocarbon (HC) reference signal output from an HC-selective laboratory reference sensor, both coupled aft of a catalytic converter for measuring tail-pipe gasses during an FTP (Federal Test Procedure) emissions test.

FIG. 1 is a graph showing data collected from a federal test procedure (FTP) run on a production vehicle from startup to 500 seconds. Reference number 101 shows a total-combustible gas signal, output from a total-combustible sensor coupled to an output side (aft) of a catalytic converter that is coupled to a spark-ignited engine. The spark-ignited engine exhausts a gas stream comprising both HC gas and other gasses, principally CO gas. Hence, the total-combustible gas signal 101 has a magnitude comprised of a first portion, dependent on a concentration of the hydrocarbon gas in the catalyzed gas stream, and a second portion, dependent on a concentration of the other combustible gasses, principally CO gas in the catalyzed gas stream. Perturbations in the total-combustible gas signal 101 are strongly influenced by a CO gas concentration present in the gas stream resulting from the FTP cycle demanded rich fuel-air ratio excursions of the engine.

FIG. 1 also shows an HC gas signal 103 derived from a laboratory reference sensor also coupled to the output side (aft) of the catalytic converter. Notice that the perturbations in the HC gas signal 103 do not always match the perturbations in the total-combustible gas signal 101. The difference is largely related to the behavior of the CO gas component making up the second portion of the magnitude of the total-combustible gas signal 101. Absent the CO gas behavior, the total-combustible gas signal 101 would be a relatively accurate measure of HC gas output from the catalytic converter.

Figure 2:
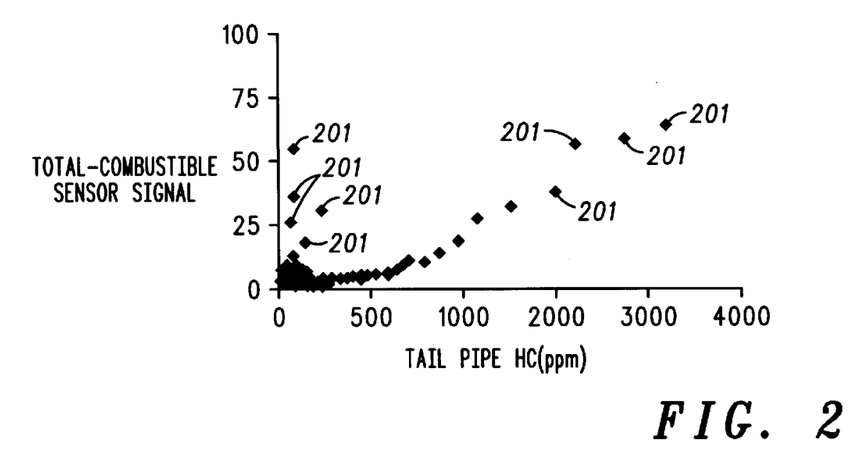
FIG. 2 is a graph showing a correlation between tail-pipe hydrocarbons as measured with the total-combustible sensor and the HC-selective laboratory reference sensor.

FIG. 2 shows another graph that illustrates a correlation between HC gas measured on the output side (aft) of a catalytic converter as measured with the total-combustible sensor in units of percentage output, and the HC-selective laboratory reference sensor, in terms of parts per million (PPM). The displayed data is second-by-second data taken during the first 1400 seconds of the FTP test cycle. Individual points on the figures represent the HC-selective laboratory reference sensor measured HC gas concentration and the total-combustible gas sensor signal during one second periods during the test. Reference number 201 shows that some of the data does not correlate well between the sensors. Essentially the data 201 is positioned well above the normal trend during measurements where CO gas dominates the total-combustible sensor. These poorly correlated datum occur primarily during rich excursions due to the relative magnitude contributions of HC gas and CO gas behavior to the total-combustible gas signal. If the proportional relationship between the contribution of HC gas and CO gasses in the total-combustible sensor's output signal could be made constant, or predictable, then the output of the total-combustible gas sensor could be used to measure absolute HC gas output.

Figure 3:
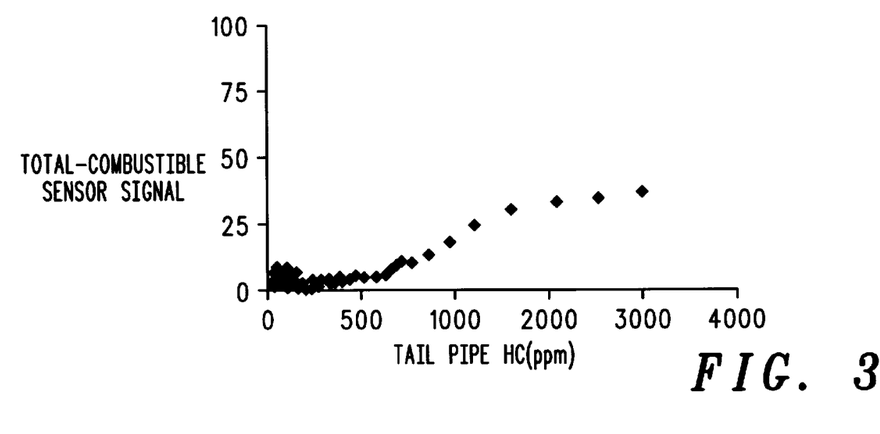
FIG. 3 is a graph illustrating an improved correlation between tailpipe hydrocarbons as measured with the total-combustible sensor and the HC-selective laboratory reference sensor, after the total-combustible gas signal has been filtered in accordance with an aspect of the invention.

FIG. 3 is a graph illustrating an improved correlation between tailpipe hydrocarbons (measured aft of the catalytic converter) as measured with the total-combustible sensor and the HC-selective laboratory reference sensor, after the signal output from the total-combustible sensor has been filtered, in accordance with one aspect of the invention. Essentially, the raw total-combustible sensor signal is processed through a non-linear filter which removes the influence of the CO gas behavior during rich air-fuel ratio excursions demanded by the FTP test cycle. So, after filtering, the proportional relationship between the contribution of HC gas and CO gasses in the total-combustible sensor's output signal is now held (constant) correlatable.

Figure 4:
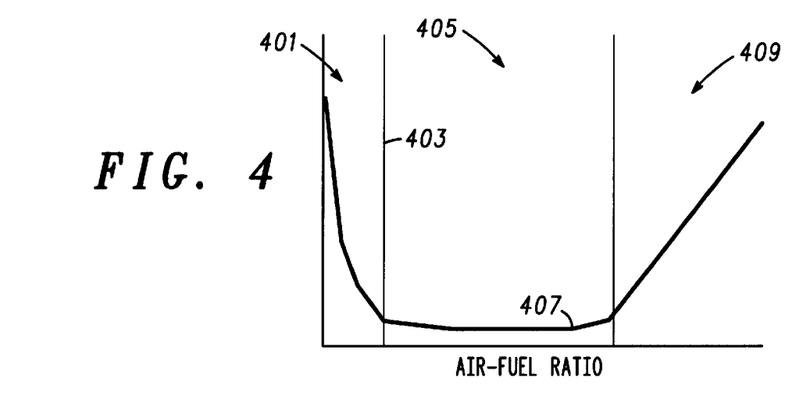
FIG. 4 a graph showing carbon monoxide concentration in an exhaust gas stream as a function of air-fuel ratio.

FIG. 4 a graph showing CO gas concentration 407 in an exhaust gas stream as a function of air-fuel ratio. Reference number 401 refers to a region on the rich side of the air-fuel ratio; reference number 403 shows a stoichiometric air-fuel ratio; and reference number 409 refers to a lean-region of the air-fuel ratio. Normally an engine is cycled in a small region about the 403 line. Then, on average the air-fuel ratio is stoichiometric and the emission of pollutants can be controlled dependent on the performance demands put on the engine and power train. This graph makes it clear that as the engine's air-fuel ratio ventures into the rich-region a magnitude of the CO gas increases significantly. Details of how to construct a system embodiment will be presented next.

Figure 5:
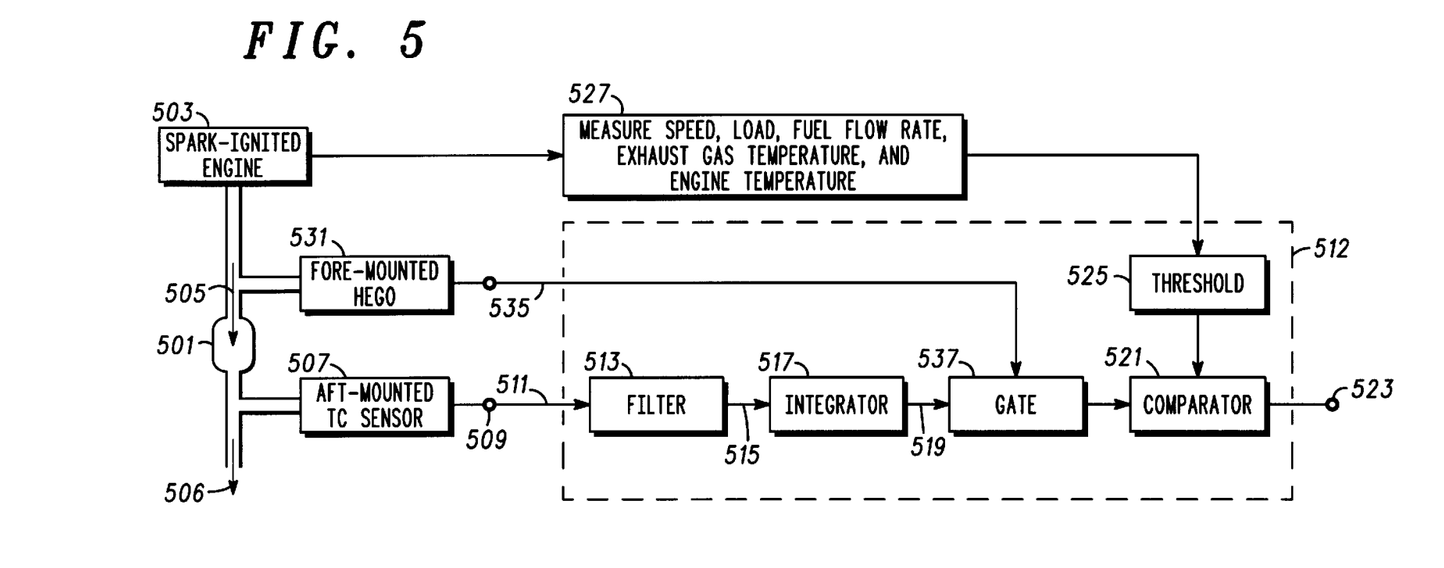
FIG. 5 is a schematic block diagram suitable for implementing a system embodiment of the invention.

FIG. 5 is a schematic block diagram in accordance with a system embodiment of the invention. A catalytic converter 501 is coupled to an exhaust portion of a spark-ignited engine 503. The catalytic converter 501 is used to remove significant portions of previously uncombusted pollutants from a combusted gas stream 505 output from the spark-ignited engine 503. The catalytic converter 501 exhausts a catalyzed gas stream 506, comprising HC gas and other gasses, primarily nitrogen (NO), carbon dioxide ($CO_2$), and water ($H_2O$).

An aft-catalytic-converter-mounted total-combustible gas sensor 507 has an output terminal 509 that provides a total-combustible gas signal 511 dependent on the chemical content of the catalyzed gas stream 506 exhausted from the catalytic converter 501. The total-combustible gas signal 511 has a magnitude comprised of a first portion, dependent on a concentration of the hydrocarbon gas in the catalyzed gas stream 506, and a second portion, dependent on a concentration of the other combustible gasses in the catalyzed gas stream 506, where a magnitude relationship between the first portion and the second portion is variable when the catalyzed gas stream 506 transitions into a region on the rich side of stoichiometry.

The type of sensor used to measure total combustibles may be a calorimetric type. Preferably, the total-combustible gas sensor 507 uses to two adjacent RTD (Resistive Thermal Device) temperature sensors with independent heater coils. A catalyst layer is deposited on top of one of the RTD devices, and a non-catalyst layer, of similar thermal characteristics, is deposited on top of the other RTD device. The catalyst layer uses a formulation similar to a contemporary three-way exhaust gas catalyst with a capability to store considerable oxygen during lean-region air-fuel ratio operation for reduction of reducing gas species under rich-region air-fuel ratio operation. The total-combustible gas sensor 507 detects energy release from chemical reactions primarily from HC gas and CO gas output aft of the catalytic converter 501. The energy is detected via temperature changes in the RTD device, or alternatively via reduced electrical power that is supplied to the independent heater coil, which is controlled to keep the RTD device at a steady temperature, or heat flux. The second (non-catalyst RTD device) heater is used to develop a reference signal to subtract out the normal heat transfer effects of conduction, radiation, and convection present at the total-combustible gas sensor's 507 physical location. The total-combustible gas sensor 507 is placed in a diffusion limited housing that is placed directly in the exhaust pipe, aft of the catalytic converter 501. Alternatively, other sensor constructions and mounting configurations can be used as long as the alternative sensor reacts to HC gas and CO gas in a correlatable manner.

A filter 513 is operatively coupled to the output terminal 509 of the total-combustible gas sensor 507. The filter 513 provides a filtered total-combustible gas signal 515 dependent on the total-combustible gas signal 511. Here, the filtered total-combustible gas signal 515 has a magnitude comprised of a first portion, dependent on the first portion of the total-combustible gas signal 511, and a second portion, dependent on the second portion of the total-combustible gas signal 511, where a magnitude relationship between the first portion and the second portion of the filtered total-combustible gas signal 515 is substantially constant when the catalyzed gas stream 506 transitions into the region on the rich side of stoichiometry. Preferably, the filter 513 is a non-linear type—such as a median filter, or a trimmed-mean filter. The nonlinear median filter successfully removes the energy from the CO gas related behavior on rich air-fuel ratio excursions by removing high-order behavior. In contrast, a linear filter would linearly attenuate both the CO gas transient and the underlying HC gas data equally, and therefore would not enable recovery of correlation between the HC gas and CO gas contributions to the total-combustible gas signal 511.

An integrator 517 is coupled to the filter 513, and provides a signal 519 indicative of a statistical measure of hydrocarbon gas content, by integrating the filtered hydrocarbon gas signal 515. The integrator 517 could be replaced by another averaging-type function. Essentially, it needs to extract the underlying trend of the data.

A HEGO 531 is coupled to either the combusted 505, or alternatively the catalyzed 506, gas stream to determine whether the gas stream is rich or lean, and produces a signal 535 indicating the gas state.

A gate 537 is coupled between the HEGO 531 and the integrator 517 and the signal 519 indicative of a statistical measure of hydrocarbon gas content in the catalyzed gas stream is made available when the gate signal is indicating the lean-state.

A comparator 521 is coupled to the gate 537. The comparator 521 provides an out-of-compliance signal 523 when the signal 519, indicative of a statistical measure of hydrocarbon gas content, exceeds a threshold provided by a threshold generating device 525. The threshold is set dependent on the HC gas limit specified by the standing legislation. The threshold can be predetermined, or/and modified based on engine operating conditions. If based on engine operating conditions, a measurement device/system 527 measures one or more engine operating characteristics comprising engine speed, engine load, fuel flow rate, exhaust gas temperature, and engine temperature. The measured engine operating characteristics can then be used to establish and/or modify a (predetermined) baseline threshold. Other engine/powertrain metrics may also be measured and used to adaptively modify the HC gas threshold. Details of how to construct a method embodiment will be presented next. A portion of the system embodiment 512 will be replaced by a more method-centric apparatus.

Figure 6:
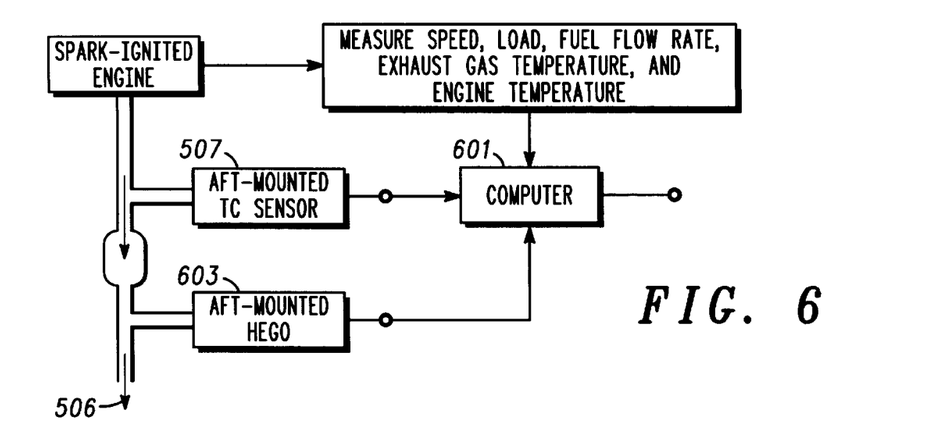
FIG. 6 is a schematic block diagram supportive of a method embodiment of the invention.

FIG. 6 is a schematic block diagram supportive of a method embodiment of the invention. A computer 601 replaces the earlier detailed portion of the system embodiment 512. The computer 601 is preferably constructed comprising a Motorola MC68332 microcontroller. The Motorola MC68332 microcontroller is programmed to execute the preferred method steps described later in the flow charts shown in FIG. 7 and FIG. 8. Another microcontroller, or other circuits could also be used to execute the later-described method steps. Also, a HEGO 603 is shown in the alternative position, measuring the catalyzed gas stream 506. Note that if the HEGO 603 is mounted aft of the catalytic converter 501 it can be physically combined with the total combustible sensor 507 in one physical package.

Figure 7:
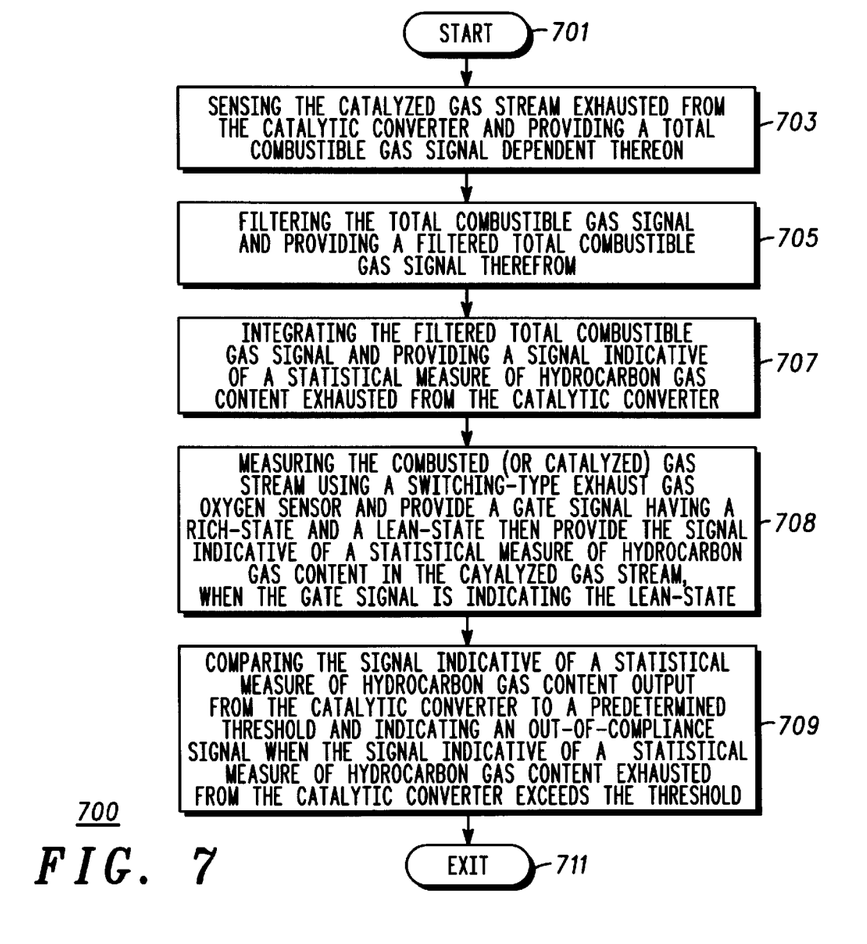
FIG. 7 is a flow chart illustrating a method embodiment of the invention.

FIG. 7 is a flow chart illustrating a method embodiment of the invention. The method, or routine 700, commences at a start step 701. In step 703, the computer 601 senses the catalyzed gas stream 506, via the total-combustible gas sensor 507, and provides a total-combustible gas signal dependent thereon The total-combustible gas signal has a magnitude comprised of a first portion, dependent on a concentration of the hydrocarbon gas in the catalyzed gas stream, and a second portion, dependent on a concentration of the other combustible gasses in the catalyzed gas stream.

A magnitude relationship between the first portion and the second portion is variable, when the catalyzed gas stream transitions into a region on the rich side of stoichiometry.

In step 705, the total-combustible gas signal is filtered and a filtered total-combustible gas signal is derived therefrom. The filtered total-combustible gas signal has a magnitude comprised of a first portion, dependent on the first portion of the total-combustible gas signal, and a second portion, dependent on the second portion of the total-combustible gas signal. A magnitude relationship between the first portion and the second portion of the filtered total-combustible gas signal is substantially constant when the catalyzed gas stream transitions into the region on the rich side of stoichiometry. The filtering step can be accomplished by a median filter, or another non-linear, or statistically based filtering technique such as a trimmed-mean filter.

Next, in step 707 the filtered total-combustible gas signal is integrated, or averaged. A signal, indicative of a statistical measure of hydrocarbon gas content in the catalyzed gas stream, is generated in the integration step 707.

In step 708, either the combusted 505, or alternatively the catalyzed 506, gas stream is measured using a switching-type exhaust gas oxygen sensor (such as a HEGO) and a gate signal 535 is provided, indicating either a rich-state or a lean-state. The signal, indicative of a statistical measure of hydrocarbon gas content in the catalyzed gas stream is made available when the gate signal is indicating the lean-state.

Then, in step 709, the signal indicative of a statistical measure of hydrocarbon gas content in the catalyzed gas stream is compared to a threshold. An out-of-compliance signal is indicated when the signal indicative of a statistical measure of hydrocarbon gas content in the catalyzed gas stream exceeds the threshold. In step 711 the routine 700 is exited.

Figure 8:
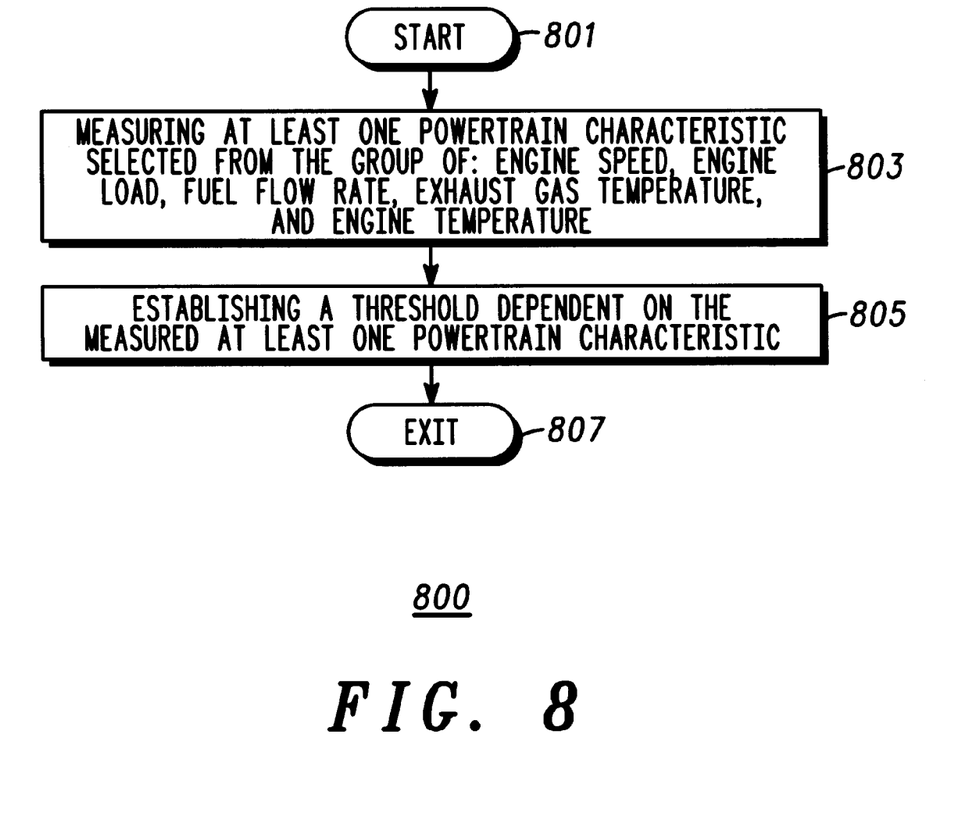
FIG. 8 is a flow chart showing further steps associated with the method illustrated in FIG. 7.

FIG. 8 is a flow chart showing further steps associated with the method illustrated in FIG. 7. The routine 800 commences at a start step 801. Next, in step 803, at least one powertrain characteristic selected from the group of: engine speed, engine load, fuel flow rate, exhaust gas temperature, and engine temperature, is measured.

Then, in step 805, threshold is established, or the existing threshold is adapted/modified, dependent on the measured at least one powertrain characteristic. In step 807 the routine 800 is exited.

An improved system for estimating tailpipe emissions in a vehicle that complies with the OBD requirements over the full FTP cycle including rich air-fuel excursions has been detailed above. The improved approach directly measures a magnitude of tailpipe emissions of HC gas and CO gas. This system and method are less complex, more accurate, is capable of finer resolution, and is easier to manufacture than prior art schemes.

What is claimed is:

1. A method for estimating tailpipe emissions in a vehicle with a catalytic converter coupled to an engine exhausting a combusted gas stream comprised of hydrocarbon gas and other combustible gasses to the catalytic converter, the catalytic converter exhausting a catalyzed gas stream dependent thereon, the method comprising steps of:

sensing the catalyzed gas stream and providing a total-combustible gas signal dependent thereon, the total-combustible gas signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry; and filtering the total-combustible gas signal and providing a filtered total-combustible gas signal dependent thereon, the filtered total-combustible gas signal having a magnitude comprised of a first portion, dependent on the first portion of the total-combustible gas signal, and a second portion, dependent on the second portion of the total-combustible gas signal, wherein a magnitude relationship between the first portion and the second portion of the filtered total-combustible gas signal is substantially constant when the catalyzed gas stream transitions into the region on the rich side of stoichiometry.

2. A method in accordance with claim 1 further comprising the step of:

integrating the filtered total-combustible gas signal and providing a signal indicative of a statistical measure of hydrocarbon gas content in the catalyzed gas stream.

3. A method in accordance with claim 1 where the step of filtering comprises a step of median filtering.

4. A method in accordance with claim 1 where the step of filtering comprises a step of trimmed-mean filtering.

5. A method in accordance with claim 1 further comprising the steps of:

establishing a threshold; and comparing the filtered total-combustible gas signal to the threshold, and indicating an out-of-compliance signal when the filtered total-combustible gas signal exceeds the threshold.

6. A method in accordance with claim 1 further comprising the steps of:

measuring the catalyzed gas stream using a switching-type exhaust gas oxygen sensor and providing a gate signal having a rich-state and a lean-state;

integrating the filtered total-combustible gas signal and providing a signal indicative of a statistical measure of hydrocarbon gas content in the catalyzed gas stream, when the gate signal is indicating the lean-state; and comparing the signal indicative of a statistical measure of hydrocarbon gas content in the catalyzed gas stream to a threshold and indicating an out-of-compliance signal when the signal indicative of a statistical measure of hydrocarbon gas content in the catalyzed gas stream exceeds the threshold.

7. A method in accordance with claim 5 further comprising the step of:

measuring at least one powertrain characteristic selected from the group of: engine speed, engine load, fuel flow rate, exhaust gas temperature, and engine temperature; and wherein the step of establishing a threshold comprises a step of establishing a threshold dependent on the measured at least one powertrain characteristic.

8. A method in accordance with claim 2 where the step of filtering comprises a step of median filtering.

9. A method in accordance with claim 2 where the step of filtering comprises a step of trimmed-mean filtering.

10. A method for estimating tailpipe emissions in a vehicle with a catalytic converter coupled to an engine exhausting a combusted gas stream comprised of hydrocarbon gas and other combustible gasses to the catalytic converter, the catalytic converter exhausting a catalyzed gas stream dependent thereon, the method comprising steps of:

sensing the catalyzed gas stream and providing a total-combustible gas signal dependent thereon, the total-combustible gas signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry;

filtering the total-combustible gas signal and providing a filtered total-combustible gas signal dependent thereon, the filtered total-combustible gas signal having a magnitude comprised of a first portion, dependent on the first portion of the total-combustible gas signal, and a second portion, dependent on the second portion of the total-combustible gas signal, wherein a magnitude relationship between the first portion and the second portion of the filtered total-combustible gas signal is substantially constant when the catalyzed gas stream transitions into the region on the rich side of stoichiometry;

measuring the combusted gas stream using a switching-type exhaust gas oxygen sensor and providing a gate signal having a rich-state and a lean-state;

integrating the filtered total-combustible gas signal and providing a signal indicative of a statistical measure of hydrocarbon gas content in the catalyzed gas stream, when the gate signal is indicating the lean-state; and comparing the signal indicative of a statistical measure of hydrocarbon gas content in the catalyzed gas stream to a threshold and indicating an out-of-compliance signal when the signal indicative of a statistical measure of hydrocarbon gas content in the catalyzed gas stream exceeds the threshold.

11. A method for estimating tailpipe emissions in a vehicle with a catalytic converter coupled to an engine exhausting a combusted gas stream comprised of hydrocarbon gas and other combustible gasses to the catalytic converter, the catalytic converter exhausting a catalyzed gas stream dependent thereon, the method comprising steps of:

sensing the catalyzed gas stream and providing a total-combustible gas signal dependent thereon, the total-combustible gas signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry;

filtering the total-combustible gas signal and providing a filtered total-combustible gas signal dependent thereon, the filtered total-combustible gas signal having a magnitude comprised of a first portion, dependent on the first portion of the total-combustible gas signal, and a second portion, dependent on the second portion of the total-combustible gas signal, wherein a magnitude relationship between the first portion and the second portion of the filtered total-combustible gas signal is substantially constant when the catalyzed gas stream transitions into the region on the rich side of stoichiometry;

integrating the filtered total-combustible gas signal and providing a signal indicative of a statistical measure of hydrocarbon gas content in the catalyzed gas stream; and comparing the signal indicative of a statistical measure of hydrocarbon gas content in the catalyzed gas stream to a threshold, and indicating an out-of-compliance signal when the signal indicative of a statistical measure of hydrocarbon gas content in the catalyzed gas stream exceeds the threshold.

12. A method in accordance with claim 11 where the step of filtering comprises a step of median filtering.

13. A method in accordance with claim 11 where the step of filtering comprises a step of trimmed-mean filtering.

14. A method in accordance with claim 11 further comprising the step of:

measuring at least one powertrain characteristic selected from the group of: engine speed, engine load, fuel flow rate, exhaust gas temperature, and engine temperature; and wherein the threshold is dependent on the measured at least one powertrain characteristic.

15. A method in accordance with claim 14 where the step of filtering comprises a step of median filtering.

16. A method in accordance with claim 14 where the step of filtering comprises a step of trimmed-mean filtering.

17. A system for estimating tailpipe emissions in a vehicle with a catalytic converter, the system having an engine exhausting a combusted gas stream comprised of hydrocarbon gas and other combustible gasses to the catalytic converter, the catalytic converter exhausting a catalyzed gas stream dependent thereon, the system comprising:

a sensor coupled to the catalytic converter, the sensor for providing a total-combustible gas signal dependent thereon, the total-combustible gas signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry; and a filter providing a filtered total-combustible gas signal dependent on the total-combustible gas signal, the filtered total-combustible gas signal having a magnitude comprised of a first portion, dependent on the first portion of the total-combustible gas signal, and a second portion, dependent on the second portion of the total-combustible gas signal, wherein a magnitude relationship between the first portion and the second portion of the filtered total-combustible gas signal is substantially constant when the catalyzed gas stream transitions into the region on the rich side of stoichiometry.

18. A system in accordance with claim 17 further comprising:

an integrator coupled to the filter, for providing a signal indicative of a statistical measure of hydrocarbon gas content in the catalyzed gas stream by integrating the filtered total-combustible gas signal.

19. A system in accordance with claim 17 where the filter is a median filter.

20. A system in accordance with claim 17 where the filter is a trimmed-mean filter.

21. A system in accordance with claim 17 further comprising:

a device for establishing a threshold; and a comparator coupled to the integrator, the comparator indicating an out-of-compliance signal when the signal indicative of a statistical measure of hydrocarbon gas content in the catalyzed gas stream exceeds the threshold.

22. A system in accordance with claim 21 further comprising:

a measurement device for measuring at least one powertrain characteristic selected from the group of: engine speed, engine load, fuel flow rate, exhaust gas temperature, and engine temperature; and wherein the device for establishing a threshold establishes the threshold dependent on the measured at least one powertrain characteristic.

23. A system in accordance with claim 18 where the filter is a median filter.

24. A system in accordance with claim 18 where the filter is a trimmed-mean filter.

25. A system for estimating tailpipe emissions in a vehicle with a catalytic converter, the system having an engine exhausting a combusted gas stream comprised of hydrocarbon gas and other combustible gasses to the catalytic converter, the catalytic converter exhausting a catalyzed gas stream dependent thereon, the system comprising:

a sensor coupled to the catalytic converter, the sensor for providing a total-combustible gas signal dependent thereon, the total-combustible gas signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is substantially constant when the catalyzed gas stream is in a region on the lean side of stoichiometry and stoichiometric, and is variable when the catalyzed gas stream transitions into a region on the rich side of stoichiometry; and a filter providing a filtered total-combustible gas signal dependent on the total-combustible gas signal, the filtered total-combustible gas signal having a magnitude comprised of a first portion, dependent on the first portion of the total-combustible gas signal, and a second portion, dependent on the second portion of the total-combustible gas signal, wherein a magnitude relationship between the first portion and the second portion of the filtered total-combustible gas signal is substantially constant when the catalyzed gas stream transitions into the region on the rich side of stoichiometry;

an integrator coupled to the filter, for providing a signal indicative of a statistical measure of hydrocarbon gas content in the catalyzed gas stream by integrating the filtered total-combustible gas signal; and a comparator coupled to the integrator, the comparator indicating an out-of-compliance signal when the signal indicative of a statistical measure of hydrocarbon gas content in the catalyzed gas stream exceeds a threshold.

26. A system in accordance with claim 25 where the filter is a median filter.

27. A system in accordance with claim 25 where the filter is a trimmed-mean filter.

28. A system in accordance with claim 25 further comprising:

a measurement device for measuring at least one powertrain characteristic selected from the group of: engine speed, engine load, fuel flow rate, exhaust gas temperature, and engine temperature; and wherein the device for establishing a threshold establishes the threshold dependent on the measured at least one powertrain characteristic.

29. A system in accordance with claim 28 where the filter is a median filter.

30. A system in accordance with claim 28 where the filter is a trimmed-mean filter.

* * * * *